3,518,205
FLUORESCENT PIGMENT
Mark S. Vukasovich, Brecksville, Ohio, assignor to The Sherwin-Williams Company, Cleveland, Ohio, a corporation of Ohio
No Drawing. Continuation-in-part of application Ser. No. 558,407, May 17, 1966. This application May 23, 1967, Ser. No. 640,713
Int. Cl. C09k 1/02
U.S. Cl. 252—301.3                          23 Claims

ABSTRACT OF THE DISCLOSURE

Product and process for producing a transparent, hard, inert silica particle with fluorescent dye and solvent sorbed within its porosity.

This pigmentary particle has usefulness in imparting a brilliant fluorescent color to paint, paper, and textile coatings, silk screen and printing inks, plastics, crayons, chalks and the like, and it can also be used to brighten non-fluorescent conventional colors.

---

This is a continuation-in-part of United States application Ser. No. 558,407 filed June 17, 1966, now abandoned.

BACKGROUND OF THE INVENTION

Fluorescence is one form of luminescence. A fluorescent substance is one which during exposure to either visible or invisible radiation emits radiation of another and usually longer wavelength and which ceases to emit almost immediately on removal of the exciting radiation source. Fluorescence is commonly thought of in connection with X-rays and ultraviolet light as the illuminating source, but many substances fluoresce when activated by visible light in addition to X-rays and ultraviolet light. Fluorescence derived from visible light activation is commonly termed "daylight fluorescence" and the emitted light or color is used extensively in advertising, decorating, and safety applications for daylight viewing. "Daylight fluorescence" is a generic term to describe the fluorescence resulting from excitation by natural sunlight or from artificial light having a spectrum generally including ultraviolet light and in which the spectrum approximates the visible spectrum of sunlight.

Daylight fluorescent pigments consisting of transparent organic plastics or resin particles containing daylight fluorescent dyes molecularly dissolved or in solid solution have been used for many years to impart brilliant color and conspicuity to bodies and surfaces. These pigments are usually made by molecularly dissolving the dye in either thermosetting or thermoplastic resins in proper concentration and while the resin is in liquid form. The solvent or carrier resin is then allowed to harden by cooling or curing and finally crushed to the desired particle size for use as a pigment. Examples of resins used as solvents or carriers for the dye and which form the solid basis for the pigment include melamine-formaldehyde, aryl monosulfonamide-aldehydes and urea or melamine formaldehyde resins and condensation products. It is recognized that fluorescent dyes are soluble in such resins and polymers as acrylonitrile, polyamides, cellulosics, polyvinyl alcohol, methyl cellulose, gum tragacanth, polyvinyl acetates, polyvinyl chlorides, polyesters, acetals and alkyds. However, some of these polymers are inferior as carriers in that they may lack lightfastness themselves, do not develop maximum color from the dissolved dyes, cannot be ground fine enough for pigment use due to natural coarseness and toughness, have a high affinity to agglomerate rather than disperse in vehicle systems, are excessively fibrous when crushed, and soften at temperatures often encountered during grinding and tend to agglomerate or ball up. In addition, many of these resinous materials are dissolved or swollen by solvents commonly employed in the paint and ink industries. A further limitation of these pigments and particularly with thermoplastic base pigments is their nature to soften at temperatures used to heat cure some coatings and injection mold some plastics.

DESCRIPTION OF THE INVENTION

In general, the preparation of the fluorescent pigment of this invention is described as contacting pigmentary silica gel with a liquid solution which solution comprises fluorescent dye in a solvent. The solvent preferably contains a fraction of essentially non-volatile solvent for the dye and essentially a volatile fraction of solvent. Deposition of the dyestuff and solvent takes place onto the surface and within the pores of the silica gel by adsorption and/or absorption both or either of which terms will herein also be called sorption. Then the dye solvents and silica gel are kept in constant contact and agitated. Agitation serves to uniformly deposit dye and solvent within the gel pores. Essentially all of the volatile solvent is removed by a drying operation, the resulting pigmentary product further processed by heating, screening and other obvious refining and recovery steps.

The pigment of this invention comprises fluorescent dye sorbed onto pigmentary insoluble inorganic silica gel with sufficient tenacity to resist leaching by water and vehicles ordinarily used in formulating finishes for coatings. While not wishing to be bound by theory of the nature of bonding between dye and gel, the following explanation is offered as descriptive of the attractive forces involved and the state of the dye molecules or ions sorbed onto the gel. The description also serves to distinguish the pigment from heretofore known daylight fluorescent pigments.

The surface of silica gel which is found predominantly within the pores is normally electronegatively charged and also, depending upon its state of dehydration, may consist of silanol groups (Si—OH) and hydrogen bonded water molecules. When surfaces thereof contact a solution containing as solute fluorescent dye or dye salt, they attract and capture the dye primarily within their porosity. The efficiency and capacity of the gel for capturing dye is dependent on the nature of the dye, the nature of the silica gel surface and other well known variables affecting sorption from solution. If the dye ionizes in solution as dye cations, it may be sorbed by ion exchange on the negatively charged surface of the gel. If the dye is an acid salt and ionizes as dye anions, or if it is non-ionic but contains free hydroxyl groups, it may be sorbed by hydrogen bonding with the surface silanol groups or bound water. The dye may also be held by residual solvent within the pore structure, and further augmented where the residual solvent is a non-volatile binder. Many layers of dye and most probably aggregates or micelles of dye are thus sorbed leading to strong fluorescence and color. Basic dyes are sorbed more readily within silica gel pores than are acidic or non-ionic dyes. This is probably due to the greater strength of the ionic bond compared to hydrogen bonds. However, the surface of the gel can be chemically modified with, for example, amines, to improve sorption of acidic and non-ionic dyes. In any event, sufficient dye can be sorbed to make the pigment of this invention.

The procedural steps for the preparation of the pigment can be altered or enhanced by modifications. Thus, a mixture of fluorescent organic dyes may be used instead of a single fluorescent dye in order to achieve a resulting pigment of the desired color combination. Similarly, non-fluorescent dyes may be used in mixture with one or more fluorescent dyes to achieve still other color combinations.

Still other substances may be dissolved in the solvent with the fluorescent dye which on sorption with the dye serve to improve performance of the pigment, usefully ultraviolet absorbers, antioxidants, optical brighteners, etc.

Optical brighteners, for example, are dyes that fluoresce blue by absorption of ultraviolet energy. Examples of such dyes are to be found amongst the classes benzoylaminostibenes, benzimanazoles, and aminocoumarones. It has been found that when optical brighteners are included in coatings containing daylight fluorescent dyes or pigments of the type described elsewhere herein, several benefits occur. These benefits include an increase of daylight fluorescence of the pigment and shifting the hue of the pigment toward the blue end of the spectrum.

Substances as aforementioned and, e.g. ultraviolet light absorbers, optical brighteners, antioxidants, and the light may also be deposited individually or in combination as a physical coating on the pigment or by secondary sorption after the initial sorption of the fluorescent substance has taken place.

The fluorescent pigment resulting from the above procedure may also be further coated with other substances and/or subjected to chemical or physical action to render the pigment resistant to leaching of the sorbed substances in hostile environments with which the pigment may come into contact. Further, the pigment may be treated with a dispersing agent to aid its introduction into coating or molding systems.

More particularly, according to the present invention, preparation of the fluorescent pigment of this invention is as follows:

(I) A suitable fluorescent organic dye is dissolved in a solvent. The solvent may comprise a volatile liquid or a mixture of a volatile fraction and poorly volatile fraction, or a volatile fraction in conjunction with a non-volatile solvent. In all instances, polar solvents are preferred. The term "non-volatile" is used to mean an organic solvent which exhibits almost no weight loss at a temperature at which the volatile solvent by comparison can be readily volatilized. Additionally, the non-volatile solvent is often a solid at room temperature (25° C.) and preferably is of high molecular weight (e.g. polymers).

(II) Contacting (I) with silica gel and allowing sorption of the fluorescent organic dye in solvent to occur.
  (A) Optionally, contacting the silica gel with other substances.
(III) Separating the dyed silica gel from the volatile solvent, drying and recovering the particulate material.
  (A) Optionally, heating the product of III to partially or fully remove sorbed volatile solvent, and to cure, if necessary, the non-volatile binder solvent.

The pigmentary product of this invention is silica gel which pores contain fluorescent dye with residuary solvent. The sorbed fluorescent dye amounts to from 0.1% to less than 5% by weight of the fluorescent pigment.

The pigments of this invention are characterized by outstanding fluorescence and color and exceptional fluorescent life and color stability upon exposure. The pigment is of comparatively simple preparation and low in material cost. The transparency of the silica gel is comparable to and exceeds common glass and surpasses the transparency of prior art daylight fluorescent pigments. The silica gel as carrier for the organic fluorescent dye and solvent in making up the pigment of this invention is itself inert and highly resistant to attack by actinic radiation and chemical normally associated with fluorescent pigment use. It has also been found the pigment readily lends itself to the preparation of water based fluorescent paints. These properties are important to extending the utility and life of these pigments and coating or molding compositions made from them.

DAYLIGHT FLUORESCENT DYES

Certain organic substances are known to fluoresce when excited by ultraviolet or visible light spectrum radiation. The Handbook of Chemistry and Physics, 37th edition, published by Chemical Rubber Publishing Company, Cleveland, Ohio (1955), and Fluorescent Chemicals and Their Applications by Jack DeMent and A. C. Dake, published by Chemical Publishing Co. Inc., Brooklyn, New York (1942) list many such substances suitable for use in practicing this present invention. Among the more useful fluorescent organic substances are certain dyes having strong daylight fluorescent behavior when molecularly dispersed or dissolved in transparent solvents and usually in low concentrations. Those dye most commonly used in present commercially available fluorescent pigments are of the xanthene, ketone imine, acridine, and naphalimide groupings. Members from these groupings have also been found useful in preparing the fluorescent pigment of this invention and imparting to the pigment intense fluorescence in a variety of colors and shadings.

Non-limiting examples of commercial daylight fluorescent dyes useful in practicing this invention are listed in the following table along with their chemical class, Colour Index number, and hue. By Colour Index is meant the designation offered in Colour Index (2nd edition, 1956) published by Society of Dyers and Colourists, England, and American Association of Textile Chemists and Colorists.

| Commercial name | Chemical class | Hue | Colour index number |
|---|---|---|---|
| Calcozine Rhodamine BX Conc. | Xanthene (rhodamine) | Reddish violet | 45170 |
| Sulpho Rhodamine B Extra. | Xanthene (rosamine) | Bluish pink | 45100 |
| Rhodamine 6 GDN Extra 500%. | Xanthene (rhodamine) | do | 45160 |
| Brilliant Sulpho Flavine FFA. | Ketonamine | Greenish yellow | 56205 |
| Calco Fluorescein | Xanthene (hydroxy-phthalein). | Greenish | 45350 |
| Rhodamine B Base | Xanthene (rhodamine) | Bluish pink | 45170B |
| Azosol Brilliant Yellow 6 GF. | Aminonaphthalimide | Greenish yellow | |
| Brilliant Yellow 6G Base | do | do | |

MISCELLANEOUS ADDITIVES

Besides the fluorescent organic substance, other substances may be sorbed by the silica gel to make a fluorescent pigment of varied or improved performance. As examples, compounds of ultraviolet adsorbers as benzophenones and benzotriazoles can be sorbed simultaneously with the fluorescent substance or through secondary sorption to act as ultraviolet radiations of short wave length and thereby extend the life of pigment fluorescent light. Brightening agents may also be sorbed by the silica gel in the manner noted above for ultraviolet light absorbers.

The optical brightener dye may be incorporated into the coating through the pigment, binder or solvent of the paint from which the coatings are laid down, or it may be included in a second clear top coat applied over a fluorescent coating. In all cases, it is required that the optical brightener be in a dissolved state rather than a simple dispersed state for maximum benefit. The quantity of optical brightener used must be at least 0.05 weight percent, preferably 0.1 weight percent, of the total coating solids.

Surfactants can be sorbed by the silica gel after the primary fluorescent substance sorption has occurred. These surfactants aid pigment dispersion in coating systems. If maximum fluorescent brightness is not the primary objective, non-fluorescent pigments and toners may be used with the fluorescent pigments to obtain a wider range of fluorescing pigment colors.

THE SOLVENT

In the practice of this present invention, solvent, both volatile and non-volatile, separately and together must dissolve the fluorescent substance and any other optional component. Polar solvents are preferred. Of course, both solvents must be miscible with one another. The volatile solvent must be easily volatilized at a temperature below that which would degrade or volatilize the dye and solid solvent. The non-volatile solvent should be substantially insoluble when dried or cured within the gel pores for use in paint formulations. With regard to paint formulation, the paint composition should be formulated to have no components which might solubilize or degrade the non-volatile solvent.

The selection of suitable polar solvents for the substances to be sorbed by the silica gel based on the above considerations can generally be accomplished by using information found in any of many reference books and articles. Thus, the solubility of the various fluorescent organic dyes, optical brighteners, ultraviolet light absorbents, and surface active agents in solvents is generally available in the open literature or can be determined experimentally.

Based on the described conditions and considerations, volatile polar solvents useful in practicing this present invention include water, alcohols, ketones, esters, glycols and glycol ethers of carbon chain lengths not exceeding about ten carbon atoms and having boiling points not above 216° C. at 760 mm. Hg. Examples of non-volatile solvents include polymers illustratively cellulose acetate, nitrocellulose, cellulose acetate butyrate, alkyd, polyvinyl alcohol, methyl cellulose, gum tragacanth, epoxies, polyurethanes and polyvinyl formal. Polymers polymerized through a vinyl group are preferred.

Silica gels (a gel can be defined as a colloidal system of solid character in which the colloidal particles constitute a coherent structure) useful in practicing this invention may be siliceous hydrogels, xerogels, or aerogels providing the gels are effective sorbents for the organic fluorescent substance and solvents and meets the general requirements for pigment materials such as particle size and size distribution, particle shape, hardness, compatibility with the system to be pigmented, and so forth. Silica hydrogels are gels in which one continuous phase is water and the other siliceous. Xerogels are gels in which the liquid phase has been evaporated. Aerogels are gels in which the liquid phase has been displaced by a gaseous phase in such a way as to avoid the shrinkage which occurs if the gel has been directly dried. The term silica gel is used herein to encompass each of these siliceous gel structures. It is not necessary that the silica gel used as the sorbent for the fluorescent substance be a pure siliceous composition. Silica-alumina gels and silica-zirconia gels and mixtures of these where the alumina and zirconia calculated as the oxides separately do not constitute more than about 10 weight percent based on the dry silica may also be used as the sorbent for the fluorescent substance and thereby constitute the particulate basis for the fluorescent pigment of this present invention. These gels are well known for their highly sorptive character, hard brittle nature, and are sufficiently transparent to be used as the carrier for fluorescent dyes. Naturally occurring porous siliceous powders including diatomaceous earths and talcs are useful.

Silica gels, silica-alumina and silica-zirconia gels etc., can be made by any of a number of well known procedures, many of which are described for reference in Soluble Silicates. Their Properties and Uses, volume II, by J. G. Vail, Reinhold Publishing Corporation, New York (1952).

Silica gel as described herein is also intended to include the valuable improvements in daylight fluorescent pigments achieved where near-white opaque pigments are added to and dispersed within the aqueous siliceous liquid precursor solutions prior to formation of the pigmentary silica gel particles as are herein described. Near-white opaque pigments particularly include, but are not limited to titanium dioxide, zinc, sulfide of phosphorescent grade, lithopone, zirconium dioxide, etc. Inert pigments may be used for light scattering efficiency. Percentages based on silica solids may range from 0.1 percent to 80 percent by weight.

Silica gels have a pore structure whose pores range from under about 2 millimicrons to over about 40 millimicrons depending on the means of gel preparation. Within a given gel structure, and even those having extremely large pores, there is a certain volume of very fine pores occurring as crevices between colloidal particles making up the gel. Silica gel porosity can then be loosely described as consisting of micropores and macropores where those smaller than about 5 millimicrons are termed the micropores. It is within both the micro and macropores of the gel and on the pore walls that the major portion of fluorescent dye and solvent sorption occurs. In order that the fluorescent dye may be sorbed it is essential that the dye be molecularly dispersed in a suitable liquid polar solvent. The solvent fraction sorbed, as above, comes from that essential solvent. In some instances the originally sorbed solvent fraction, as in the case of methanol, is displaced by atmospheric water.

It is the quality of these gels to sorb useful amounts of both fluorescent substance and solvent. It is also the quality of these gels that they are sufficiently transparent to ultraviolet and visible spectrum light from about 350 to 700 millimicrons in wavelength to allow fluorescence of the sorbed substance to take place and the resultant colors to be seen by the eye.

The gel particles used in the practice of the present invention have a size less than about 20 microns. It has been found this size gives particularly good fluorescence in coatings and is not excessively coarse for most coating applications. This silica gel may be reduced to this size either before or after sorption of the fluorescent dye and any other substances has taken place, but it is preferred to attain the desired particle size prior to the sorption step in the fluorescent pigment preparation procedure.

The gel must be sufficiently sorptive to pick up enough dye and solvent to yield a pigment having useful color and fluorescence intensity.

It has been determined that a minimum sorbtive capacity to meet the requirement of practical utility is a gel having a pore volume of at least 40 cubic centimeters per 100 grams of silica gel. Above 40 cubic centimeters per 100 grams the pigmentary quality of the gel improves.

The preferred form of pigment of this invention has sorbed within its pores at least 40 cubic centimeters of dye solution consisting of fluorescent dye (and optionally other additives) dissolved in an organic non-volatile solvent (preferably solid at 25° C.) per 100 grams of silica gel. The volume of non-voltatile solution sorbed and held by the silica gel is preferably not less than this quantity, otherwise the resultant pigment color will be relatively weak. It is also required that the volume of non-volatile solution sorbed by the silica gel does not exceed the available pore volume of the gel. All non-volatile solution sorbed should be within the pore structure of the gel. If excess non-volatile solution is sorbed and deposited externally of the pores of the gel, the resultant product would agglomerate excessively instead of producing the desired free-flowing pigmentary size powder. The necessary volume relationship between available gel porosity and solid solution can be expressed mathematically as $X \geq Y$, or X must be greater than or equal to Y, where X is the available pore volume of the silica gel available for and capable of sorbing the non-volatile solution and Y is the volume of sorbed non-volatile solution. The preferred volume of sorbed non-volatile solution plus the fluorescent dye and ancillary components should exceed 40 cubic centimeters per 100 grams of silica gel.

The solution containing the sorbate can be brought into contact with the silica gel by any convenient means without departing from the scope of this invention. Commonly, the gel patricles are simply placed in the solution of fluorescent organic dye (plus miscellaneous additives) and suitable solvents and the mixture stirred to speed and to promote uniform dye sorption. The dyed gel particles are separated and dried to remove a substantial portion of the volatile solvent. The result is the pigment of this invention, a free-flowing daylight fluorescent pigment powder.

The following examples are offered to illustrate the preparation of fluoroescent pigment of this invention.

Example I 0.32 gram of Rhodamine B Base (American Cyanamid Co.), a xanthene group fluorescent red dye, was dissolved in 100 milliliters of an aqueous sodium silicate solution having a $Na_2O/SiO_2$ weight ratio of 3.2 and containing 40 grams of silica as silicate (N grade sodium silicate solution, Philadelphia Quartz Co.). This solution was added with vigorous stirring to 350 milliliters of 0.43 normal aqueous acetic acid solution. Stirring was discontinued immediately upon completion of the addition and the mixed solutions gelled in 90 seconds. The fluoroescent red colored hydrogel was broken into pea size lumps and soaked 15 hours in 1000 milliliters of a 10 weight percent ammonium acetate aqueous solution. This soaking allowed gel syneresis to take place and also served to remove the bulk of sodium ions by leaching and zeolitic replacement by ammonium ions. The hydrogel was further washed profusely with water to further remove residual soluble reaction products without visual loss of fluorescent dye through leaching. The washed hydrogel was then dried at 80° C. for 6 hours and pulverized to a fine powder of between 1 and 10 microns in particle size. The dried, pulverized product consisting of 0.8 weight percent dye on the silica basis was a daylight fluorescent, intensely red colored pigment.

Example II 0.20 gram of Calcozine Rhodamine BX (American Cyanamid Co.), a xanthene group fluorescent red dye, was dissolved in 600 milliliters of water and this solution was stirred with 40 grams silica xerogel of predominently 5 to 10 microns in size until exhaustion of the solution color showed all the dye to have been sorbed by the silica xerogel. The dyed silica was recovered by filtration and dried 3 hours at 105° C. The resultant pigment product containing 0.5 weight percent dye was brilliantly daylight fluorescent of lilac-red color.

Example III

An orange-red fluorescent pigment was prepared using the procedure of Example II but substituting three dyes, 0.20 gram Rhodamine 6 GDN Extra (Allied Chemical Corp.), 0.20 gram Rhodamine B Extra S (General Aniline and Film Corp.), both xanthene group dyes, and 0.10 gram Azosol Brilliant Yellow 6GF (General Aniline and Film Corp.), and azo group dye, for the 0.20 gram Rhodamine 6 GDN Extra of Example II. The resultant pigment product containing 1.25 weight percent dye was an orange-red brilliant daylight fluorescent color.

Example IV

The procedure of Example II was repeated to prepare a similar appearing lilac-red fluorescent pigment excepting 40 grams of silica-alumina xerogel having a composition of 90 weight percent silica and 10 weight percent alumina was substituted for the silica xerogel of Example II.

Example V

The product of Example III was stirred with 500 milliliters of a solution of 0.20 gram of 5-chloro-2-hydroxybenzophenone in ethanol (an ultraviolet light absorber). The silica xerogel basis pigment was recovered by filtration and dried 4 hours at 50° C. The ethanol filtrate was analytically determined to be virtually devoid of any remaining ultraviolet light absorber. The resultant pigment product appeared similar in fluorescence and coloration to the product of Example III.

Example VI

A fluoroescent red colored pigment having the property of imparting hiding power to paints and inks made from it was prepared as follows. 20 grams of rutile titanium dioxide of pigment size and grade was dispersed by stirring into 100 milliliters of aqueous sodium silicate solution of the same type described in Example I. This dispersion was added with vigorous stirring to 350 milliliters of 0.43 normal aqueous acetic acid and stirring stopped after the addition was completed. The mixture gelled in 90 seconds with the product being a silica hydrogel in which was physically entrapped the opaque, dispersed titanium dioxide surrounded by a transparent silica gel matrix. The hydrogel was broken up into pea size lumps and submerged overnight in a large volume of water to remove the bulk of water soluble reaction product from the hydrogel. The hydrogel was further washed profusely with water to remove residual sodium acetate and acetic acid then dried 15 hours at 200° C. to form an opaquely pigmented silica xerogel. The xerogel was pulverized to a fine powder of less than 15 microns in size and placed in 100 milliliters of aqueous solution containing 0.30 gram of Rhodamine 6 GDN Extra (Allied Chemical Corp.), a xanthene group fluoroescent dye. The mixture was stirred for 2 hours after which time all dye was visibly exhausted from the liquid and sorbed by the silica xerogel. The dyed powder was recovered by filtration and dried 2 hours at 105° C. The product was a daylight fluorescent, red colored pigment whose particles were internally opaquely white pigmented and whose surface was fluorescent red colored consisting of 0.5 weight percent dye on the pigment basis.

The fluorescent pigment products of this invention can be used to make fluorescent colored paints, inks, molded or cast plastic or resinous articles and the like which in turn can be used for advertising, safety, and decorative applications. Illustrative, but not limiting in scope, examples of compositions using fluorescent pigments of this invention are given in the following.

Example VII.—Paint formulation

Vehicle: Weight parts
Acrylic polymer (Lucite 2044—E. I. duPont de Nemours) _____ 22
High flash naphtha _____ 43
Oleic, linoleic, linolenic fatty acid alkyl resin _____ 13.5
Mineral spirits _____ 21.5

*Pigment.*—Fluorescent pigment from any one of Examples I through VI and X through XV are used.

35 weight parts of pigment and 65 weight parts of the vehicle are thoroughly mixed and the pigment dispersed within the vehicle by high speed stirring. The resulting fluorescent paint can be rolled, brushed, or sprayed onto a surface for a brilliant fluorescent colored coating. It is preferred the surface be previously coated with a white paint to obtain maximum fluorescent brilliance.

Example VIII

Vehicle: Weight parts
50/50 weight ratio styrene copolymer (276V-2-Dow Chemical Company) and linseed maleic ester resin _____ 30
High flash naphtha _____ 56
Ethyl cellulose _____ 7
Mineral spirits _____ 7

*Pigment.*—Fluorescent pigment from any one of Examples I through VI and X through XV are used.

42 weight parts of pigment and 58 weight parts vehicle are thoroughly mixed by high speed stirring useing glass beads as a milling media until a pigment dispersion of Hegman Gage 5 reading is obtained. The resulting fluorescent colored product can be used in the silk screen printing process.

Example IX.—Vinyl plastisol molding

Weight parts
Vinyl chloride (Geon 121—B. F. Goodrich Chem. Co.) _____ 75
Dioctyl phthalate _____ 15
Fluorescent pigment from any one of Examples I through VI and X through XV can be used. _____ 10

The components are thoroughly mixed using a dough mixer, then molded and fused to the desired shape at 170° C. to achieve an article which is brilliantly fluorescent colored.

Example X 0.3 gram of fluorescent pink xanthene class dye Calozine Rhodamine BX Conc. (American Cyanamid Company) was dissolved in a solution consisting of 59.7 grams vinyl chloride-vinyl acetate copolymer resin having a density of 1.36 grams per cubic centimeter, and 40 milliliters of methanol and 100 milliliters each of isophorone, Cellosolve acetate, an dcyclohexanone as the volatile solvents. To this was added with constant stirring 100 grams of silica gel having an average particle size of 7 microns and an oil absorption of about 80 pounds oil per 100 pounds silica gel equivalent to about 86 cubic centimeters oil per 100 grams silica gel. The dispersed slurry was tansferred to a glass tray and placed in an oven at 105° C. to remove the volatile solvents and deposit the dye and non-volatile resin as a solid solution within the gel pores. The slurry and subsequently the paste and powder were agitated frequently to bring about a uniform sorption of solid solution. After volatilization of the resin solvents, the dry pigment powder was screened through a 400 mesh sieve to insure breakup of any loose agglomerates. The resultant product was an intensely fluorescent pink pigment powder containing 0.5 weight percent dye on the solid solution basis and about 0.19 weight percent dye on the pigment basis.

Example XI 3 grams of fluorescent yellow solvent dye Brilliant Yellow 6G Base (Allied Chemical Corp.) was dissolved in 900 milliliters of acetone and 100 milliliters of methanol along with 97 grams of cellulose triacetate powder. To this was added with constant stirring 100 grams of silica gel having an average particle size of 4 microns and an oil absorption of about 300 pounds oil per 100 pounds silica gel equivalent to about 322 cubic centimeters oil per 100 grams silica gel. The dispersed slurry was transferred to a vertical tube through which warm air was blown through a fritted glass base of the tube to agitate and in time suspend the particles. After drying, the particles were free flowing and essentially free of agglomerates and could be readily dispersed and used to form a fluorescent paint composition. The pigment was intensely fluorescent greenish-yellow and contained about 3 weight percent dye on the solid solution basis and about 1.5 weight percent dye on the pigment basis. The solid solution volume sorbed by the silica gel pores amounted to about 19.5 percent of the volume of oil absorbed by the gel when measured by ASTM Method D-1483.

Example XII

The experiment of Example XI was repeated except 20 grams of the same silica gel was used instead of the 100 grams used in Example XI. The resultant dry product while intensely fluorescent greenish-yellow in color was a tenaciously agglomerated cake which could only be partially broken up by grinding and was therefore unsuited as a pigment.

This unsatisfactory product contained 3 weight percent dye on the solid solution basis as did Example XI; however, the solid solution volume deposited upon and within the gel amounted to 92 percent of the volume of oil absorbed by the gel when measured by ASTM Method D-1483.

Example XIII

The experiment of Example XI was repeated except 6 grams of the solvent dye Brilliant Yellow 6G Base and 94 grams of cellulose triacetate powder were used in place of 3 grams and 97 grams, respectively. The resultant free flowing pigment powder was mustard yellow in color but lacked any detectable or measurable fluorescence. The solid solution in this case consisted of 6 weight percent dye which was an excessive concentration of dye for fluorescene to occur.

Example XIV

The experiment of Example X was repeated exept 0.06 gram of optical brightener Tinopal SFG (Geigy Chemical Corp.) corresponding to 0.1 weight percent of the solid solution was also dissolved in the solution containing dye, resin, and volatile solvents. The resultant pigment product visually appeared similar to the pigment product of Example X.

Example XV 20 grams of the pigment containing the optical brightener was dispersed in a vehicle consisting of 40 grams of acrylic resin and 60 grams of toluene and a 0.002 inch dry film thickness coating was deposited from this formulation onto white paper. 20 grams of the pigment of Example X was identically formulated into a finish and the same thickness dry film coating was deposited from this on the same white paper.

The fluorescence intensity of both coatings were measured when illuminated with C.I.E. source C, a standard artificial daylight lamp. The coating containing the pigment which had the optical brightener included in solid solution exhibited about 10 percent more reflectance or fluorescence than the coating containing the pigment of Example X.

Example XVI

A novel pigment of useful behavior was made by sorbing up to 0.75 weight percent Calcozine Rhodamine BX Conc. (American Cyanamid Co.), a reddish violet daylight fluorescent xanthene class dye, onto finely subdivided silica gel within whose bulk was dispersed 30 weight percent pigmentary size phosphorescent grade zinc sulfide (Fisher Scientific Co., Z-73). The silica gel particles containing the phosphorescent zinc sulfide but without sorbed dye exhibited a yellow green phosphorescence when illuminated with a tungsten lamp. These pigments are useful as in making phosphorescent coatings. These same particles but containing the sorbed dye phosphoresced and/or fluoresced with orange hue under the same illumination. When the sorbed dye concentration was decreased, the emitted light increased in intensity reaching a maximum at between 0.05 to 0.3 weight percent sorbed dye. Sorbed Brilliant Yellow 6G Base (Allied Chemical Corp.), an aminonaphthalimide class dye, emitted with even greater intensity of a greenish-yellow hue and could be usefully sorbed to the extent of 4.0 weight percent of the phosphor containing silica gel. It is apparent that a wide range of such pigments can be made having varying hues and emission intensities by using still other fluorescent dyes and phosphors, alone or in combination. The phosphor content of the silica gel particles may vary up to 80 weight percent without seriously degrading the sorptive property of the gel or the usefulness of this dyed pigment. Besides their obvious use as pigments for fluorescent coatings and for fluorescent coatings exhibiting an afterglow of light and color when the exciting light source was removed, these pigments have utility in those applications where phosphorescent pigments are now used but where for some reason greater emission intensity or change in the emitted hue is desired.

Besides sorbing daylight fluorescent dyes onto silica gel to obtain daylight fluorescent pigments, chromotropic dyes can also be sorbed to yield pigments possessing utility in that they change hue when light of varying intensity is incident upon them or on coatings containing these pigments. Such pigments or coatings are said to have a "chameleon" type behavior. Non-limiting examples of chromotropic dyes which may be used in the practice of this invention are mercury, zinc, and palladium salts of the diphenylthiocarbazonates. These salts may be sorbed directly or they may be formed by first sorbing the diphenylthiocarbazonates and reacting this in situ with the desired metal cations introduced by sorption either at the same time or later. The chromotropic dye or colorant should be deposited to the extent of greater than 5 weight percent of the pigment weight to achieve useful coloration and color change. Hues and cure changes are available from chromotropic dyes or colorants spanning essentially the entire visible spectrum.

An accelerated ultraviolet light and weathering exposure test was used to evaluate the fluorescence retention of pigments made by the process of this invention through a visual comparison with similarly tested commercial resin base fluorescent pigments.

Test panels were prepared by making a thick paste of the pigments in a xylene thinned, air drying, clear acrylic lacquer and depositing them to form 5 mil thick dry coatings on glass plates. The quantity of pigment used in each coating was made such that all coatings were equivalent in fluorescent dye weight. Half of each plate and coating was covered with aluminum foil to protect and preserve that section as a reference of original fluorescence. The plates were simultaneously exposed in a weatherometer for 90 minutes to a 95 percent relative humidity air atmosphere at 50° C. while under intense ultraviolet exposure, then removed for examination. Panels made using pigments of the type described in this present invention were visually compared against commercial pigments of similar color for fluorescence retention. It was observed the commercial pigments lost equivalent or a greater degree of fluorescence in this comparison. This equivalent or superior fluorescence retention of pigments containing an ultraviolet light absorber and for those without providing the comparison was against a pigment similarly containing or void of an ultraviolet light absorber.

For the fluorescent pigment to fluoresce efficiently and intensely, the dye must be sorbed in low concentration. In pure solid state or in a concentrated solution, the fluorescent dyes show almost no fluorescence and instead they appear dark or dirty. The explanation generally offered for this is that the fluorescing molecules are so close together that they quench or resorb their own fluorescent light. A usefully fluorescent pigment can only be prepared if the fluorescent substance sorbed by the gel is in the range from about 0.1 percent to 5 weight percent based on the weight of the non-volatile solvent. This amount of sorbed fluorescent substance may be sorbed from a highly concentrated solution or it may be sorbed by using dilute solutions of the fluorescent dye. It is only important that the sorbed concentration limit is not exceeded or that sufficient solution is brought into contact with the silica gel such that the fluorescent dye and non-volatile solvent are sorbed to the extent described.

The embodiments of the invention in which an exclusive property or privilege is claimed are defined as follows:

1. The method of preparing a fluorescent pigment comprising:
    (A) preparing a solution comprising a fluorescent dye in a solvent mixture which mixture is a solvent for the dye, said mixture containing a volatile solvent component having a boiling point below about 216° C. and a nonvolatile normally solid organic polymeric resinous component which is solid at 25° C.;
    (B) contacting (A) with pigmentary silica gel particles;
    (C) sorbing the dye solution (A) with the gel;
    (D) volatilizing the volatile fraction of said solvent mixture; and
    (E) recovering a free-flowing fluorescent pigment.
2. The method of claim 1, wherein the fluorescent dye is soluble in polar solvents, and the volatile solvent component is a polar solvent.
3. The method of claim 2, wherein the polar solvent is water.
4. The method of claim 2, wherein the polar solvent is organic.
5. The method of claim 2, wherein the polar solvent is selected from the class consisting of water, methanol, etthanol, acetone and methyl ethyl ketone.
6. The method of claim 1 wherein the amount of fluorescent dye sorbed in the silica gel is in an amount of from about 0.05 to 5 weight percent of the free flowing pigment weight.
7. A daylight fluorescent pigment comprising pigmentary silica gel particles, the pore volume of which is in excess of 40 cubic centimeters per 100 grams, having a fluorescent dye and a solid organic resin sorbed within said pore volume.
8. The product of claim 7 wherein the sorbed fluorescent dye is from 0.1 to less than 5 percent by weight of the fluorescent pigment.
9. The product of claim 7, where the silica gel particles contain a white opaque pigment.
10. The product of claim 9, where the white opaque pigment is $TiO_2$.
11. The product of claim 9, where the white opaque pigment is phosphorescent zinc sulfide.
12. The product of claim 9 wherein there is also present ultraviolet light absorbers and optical brighteners.
13. The method of claim 1, where the organic polymer is characterized by polymerization through vinyl groups.
14. A daylight fluorescent pigment comprising pigmentary silica gel particles the pores of which particles contain a solution, said solution comprising a fluorescent dye in a solvent which is normally solid and substantially non-volatile at 25° C.
15. The product of claim 14, where the solid is a polymer characterized by polymerization through a vinyl group.
16. The product of claim 14, where the solid is a modified cellulose characterized by its solubility in polar solvents.
17. The product of claim 14, where the pigmentary silica gel particles contain dispersed therein a white opaque pigment.
18. The product of claim 14, wherein the fluorescent dye solution contains an optical brightener.
19. The product of claim 14, wherein the fluorescent dye solution contains an ultraviolet absorber.

20. The product of claim 17 where the white opaque pigment is titanium dioxide.

21. The product of claim 17 where the white opaque pigment is phosphorescent zinc sulfide.

22. The product of claim 14, wherein the fluorescent dye is present from about 0.1 to less than 5 percent by weight of the fluorescent pigment.

23. The product of claim 14, wherein the daylight fluorescent pigment has an average particle diameter less than 20 microns.

References Cited

UNITED STATES PATENTS

| | | | |
|---|---|---|---|
| 2,916,344 | 12/1959 | Kukin | 8—3 |
| 2,924,549 | 2/1960 | Klein et al. | 162—162 |
| 3,117,227 | 1/1964 | Pollack | 250—71 |
| 3,230,178 | 1/1966 | Bennahmias | 252—301.3 |

FOREIGN PATENTS 524,854  8/1940  Great Britain.

OTHER REFERENCES

Gyani: Jour. Indian Chem. Soc., Ind. and News Ed. vol. 13, No. 1 (1950), pp. 1–12.

Kirk-Othmer: Encyclopedia of Chemical Technology, vol. 12 (1954), Interscience Publishers, Inc., New York, N.Y., pp. 346–7, 356–7.

TOBIAS, E. LEVOW, Primary Examiner

A. P. DEMERS, Assistant Examiner

U.S. Cl. X.R.

8—8; 117—33.5; 252—301.2